(12) United States Patent
Kuo (10) Patent No.: US 12,338,927 B1
(45) Date of Patent: Jun. 24, 2025

(54) QUICK-RELEASE CONNECTOR SWITCH DEVICE

(71) Applicant: CHIA CHERNE INDUSTRY CO., LTD., Chang Hwa (TW)

(72) Inventor: Ching-Sheng Kuo, Chang Hwa (TW)

(73) Assignee: CHIA CHERNE INDUSTRY CO., LTD., Chang Hwa (TW)

( * ) Notice: Subject to any disclaimer, the term of this patent is extended or adjusted under 35 U.S.C. 154(b) by 0 days.

(21) Appl. No.: 18/678,261

(22) Filed: May 30, 2024

(51) Int. Cl.
*F16L 37/086* (2006.01)

(52) U.S. Cl.
CPC .................. *F16L 37/086* (2013.01)

(58) Field of Classification Search
CPC ..... F16L 37/0841; F16L 37/086; F16L 37/10; F16L 37/101; F16L 37/12; F16L 37/123; F16L 2201/00
See application file for complete search history.

(56) References Cited

U.S. PATENT DOCUMENTS

| | | | | |
|---|---|---|---|---|
| 3,167,092 A * | 1/1965 | Abramson | ............ | F16L 37/101 |
| | | | | 137/614.01 |
| 4,541,457 A * | 9/1985 | Blenkush | ................ | F16L 37/42 |
| | | | | 285/317 |
| 5,033,777 A * | 7/1991 | Blenkush | ................ | F16L 37/42 |
| | | | | 285/317 |
| 5,845,943 A * | 12/1998 | Ramacier, Jr. | .......... | F16L 37/42 |
| | | | | 285/317 |
| 9,528,649 B2 * | 12/2016 | Aoki | ....................... | F16L 37/44 |
| 10,801,655 B2 | 10/2020 | Wu | | |
| 2005/0012330 A1 * | 1/2005 | Schmidt | .................. | F16L 37/42 |
| | | | | 285/317 |
| 2010/0276922 A1 * | 11/2010 | Rehder | ............... | F16L 37/0841 |
| | | | | 285/82 |
| 2012/0153615 A1 * | 6/2012 | Rehder | ................... | F16L 37/32 |
| | | | | 285/305 |
| 2013/0333767 A1 * | 12/2013 | Schmidt | .................. | F16L 37/35 |
| | | | | 137/454.2 |
| 2014/0062080 A1 * | 3/2014 | Battisti | ................. | F16L 37/086 |
| | | | | 285/86 |
| 2020/0200310 A1 * | 6/2020 | Tiberghien | .......... | F16L 37/0841 |

(Continued)

FOREIGN PATENT DOCUMENTS

TW          M649802          12/2023

*Primary Examiner* — Aaron M Dunwoody
(74) *Attorney, Agent, or Firm* — Muncy, Geissler, Olds & Lowe, P.C.

(57) ABSTRACT

A quick-release connector switch device, for being equipped with a quick-release connector, includes an annular switch. The quick-release connector includes a first connector, a second connector and a pressing fastener, the first connector includes a first pipe body, the second connector includes a second pipe tube provided with a radial chute. The annular switch includes an annular chute, a through hole and a convex surface, the annular switch is rotatably sleeved on the second pipe body, the annular chute aligns with the radial chute for the pressing fastener passing through, and the annular switch rotates relative to the radial chute to have an opening position and a closing position. When at the opening position, the pressing fastener aligns with the through hole to be capable of being pressed. When at the closing position, the pressing fastener aligns the convex surface to be abutted and not capable of being pressed.

6 Claims, 8 Drawing Sheets

(56) References Cited

U.S. PATENT DOCUMENTS

2020/0300396 A1\* 9/2020 Burdge .................. F16L 37/40
2022/0243848 A1\* 8/2022 Truong ................ F16L 37/248
2023/0213128 A1   7/2023 Kuo \* cited by examiner

QUICK-RELEASE CONNECTOR SWITCH DEVICE

FIELD OF THE INVENTION

The present invention relates to a switch device, and in particular to a quick-release connector switch device.

BACKGROUND OF THE INVENTION

A liquid cooling system has a good heat radiating effect, which can effectively increase maximal operating power of an electronic component, and is already widely used in high-efficient electronic components. In order to meet the pipeline configuration requirements of various systems, the liquid cooling system will have multiple fluid pipelines, and pipeline connectors are provided on different fluid pipelines for disassembling and assembling. The conventional pipeline connectors are screw-locked, which are difficult to operate in a narrow space.

Therefore, for example, US 2023/0213128 A1 is provided with a quick connector that can be quickly coupled or separated. However, there is a possibility of the pipeline being separated once the pipeline is pulled due to lacking of a lock.

A quick coupler assembly disclosed in U.S. Pat. No. 10,801,655 B2 is provided with a quick release locking sleeve used for controlling the connecting or the separating. However, the quick coupler assembly requires both hands for operating the quick release locking sleeve to slide for controlling the connecting or the separating, which is still inconvenient in operation.

Further, as disclosed in TW M649802, two connectors can be unlocked and separated by pressing a fastener with one hand, and the two connectors will be automatically locked after connecting together. However, during actual operation, there may be troubles of accidentally touching or accidentally squeezing the fastener, resulting in an unexpected separation.

SUMMARY OF THE INVENTION

A main object of the invention is to disclose a switch device configured to a quick-release connector for controlling whether to activate the quick-release function to prevent an unexpected separation of the connectors from an accidental contact.

In order to achieve the above object, the invention provides a quick-release connector switch device for being equipped with a quick-release connector. The quick-release connector includes a first connector, a second connector, and a pressing fastener, the first connector includes a first pipe body and an annular groove recessed on an outer edge of the first pipe body. The second connector includes a second pipe body provided with a radial chute radially passing through the second pipe body.

The pressing fastener slidably passes into the radial chute and comprises a locking position and an unlocking position, a pressing spring is disposed between the pressing fastener and the second pipe body to push the pressing fastener moving from the unlocking position to the locking position.

The pressing fastener includes an opening and a snap portion, the opening is provided for the first pipe body to pass through, the snap portion is adjacent to the opening, when the pressing fastener is at the locking position, the snap portion is clamped into the annular groove to fix the first pipe body, when the pressing fastener is at the unlocking position, the snap portion does not clamp into the annular groove so that the first connector and second connector are in a separable state.

The quick-release connector switch device includes an annular switch provided with an annular chute, a through hole and a convex surface, the annular switch is rotatably sleeved on the second pipe body, and the annular chute is located on the radial chute for the pressing fastener passing through the annular chute. The annular switch is configured to rotate relative to the radial chute to provide with an opening position and a closing position. When the annular switch is located at the opening position, the pressing fastener aligns with the through hole so that the pressing fastener is allowed to pass the through hole to be capable of being pressed to compress the pressing spring, and the first connector and the second connector are in the separable state. When the annular switch is located at the closing position, the pressing fastener aligns the convex surface, and the convex surface abuts the pressing fastener so that the pressing fastener is not capable of being pressed.

Accordingly, the quick-release connector equipped with the switch device controls the pressing fastener in a state of being pressed or in a state of not being pressed by rotating the annular switch to the opening position or the closing position, so as to prevent an unexpected separation of the first connector and the second connector from an accidental contact.

DETAILED DESCRIPTION OF THE PREFERRED EMBODIMENTS

The detailed description and technical content of the invention are described below with reference to the accompanying drawings.

Please refer to FIG. 1, FIG. 2, FIG. 3, and FIG. 4. The invention provides a quick-release connector switch device A configured on a quick-release connector B. The quick-release connector B includes a first connector 10, a second connector 20, a pressing fastener 30 and a pushing rod 40. The first connector 10 includes a first pipe body 11, an annular groove 12 and a first flow channel 13, the annular groove 12 is recessed on an outer edge of the first pipe body 11, and the first flow channel 13 axially penetrates the first pipe body 11. In one embodiment, the first pipe body 11 is locked and connected to a first pipe connector 14.

Figure 4:
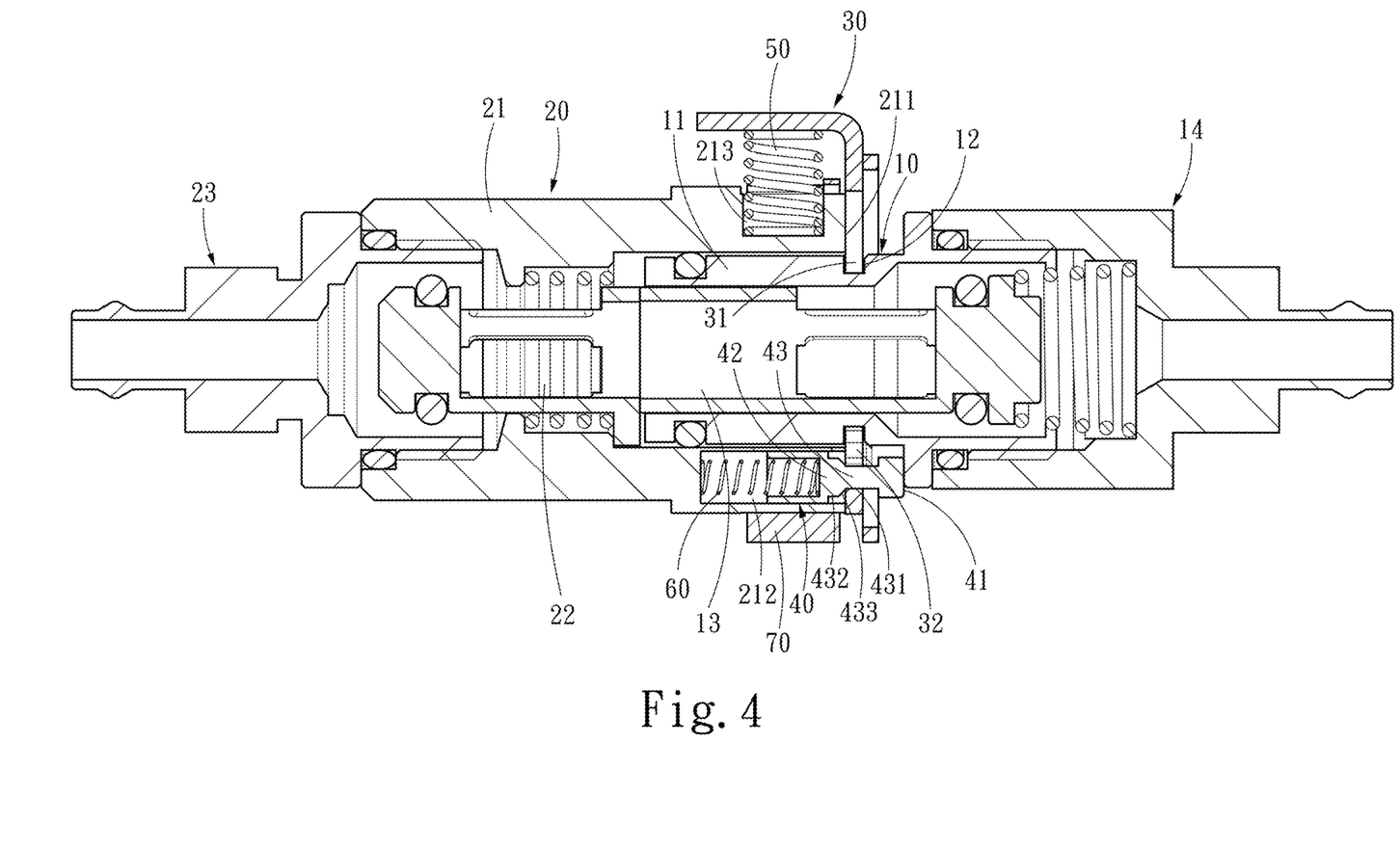
FIG. 4 is a structural cross-sectional diagram of the quick-release connector of the invention at a locking position.

The second connector 20 includes a second pipe body 21 and a second flow channel 22, the second flow channel axially penetrates the second pipe body 21 for accommodating the first pipe body 11 penetrating therein.

As shown in FIG. 4, the second pipe body 21 includes a radial chute 211 and an axial chute 212. The radial chute 211 radially passes through the second pipe body 21 and extends into the second flow channel 22. An opening of the axial chute 212 faces the first connector 100 and is parallel to an axial direction of the second pipe body 21. In an embodiment, the second connector 20 is provided for locking and connecting to a second pipe connector 23.

Figure 5:
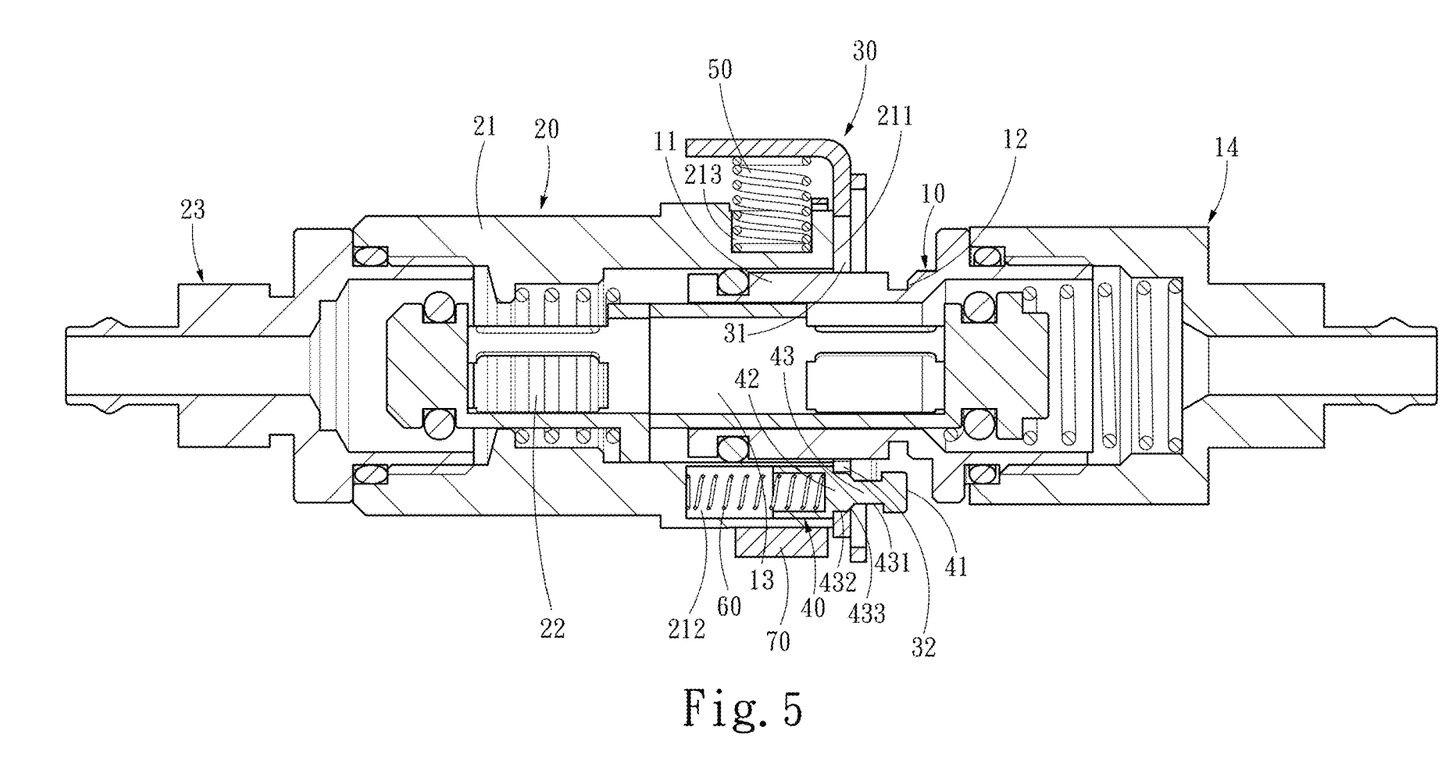
FIG. 5 is a structural cross-sectional diagram of the quick-release connector of the invention at an unlocking position.

Please refer to FIG. 4 and FIG. 5. The pressing fastener 30 slidably passes into the radial chute 211 and includes a locking position (as shown in FIG. 4) and an unlocking position (as shown in FIG. 5) in the radial chute 211. A pressing spring 50 is disposed between the pressing fastener 30 and the second pipe body 21, the pressing spring 50 pushes the pressing fastener 30 moving from the unlocking position to the locking position. In an embodiment, the second pipe body 21 includes a recess 213 for accommodating the pressing spring 50.

Figure 3:
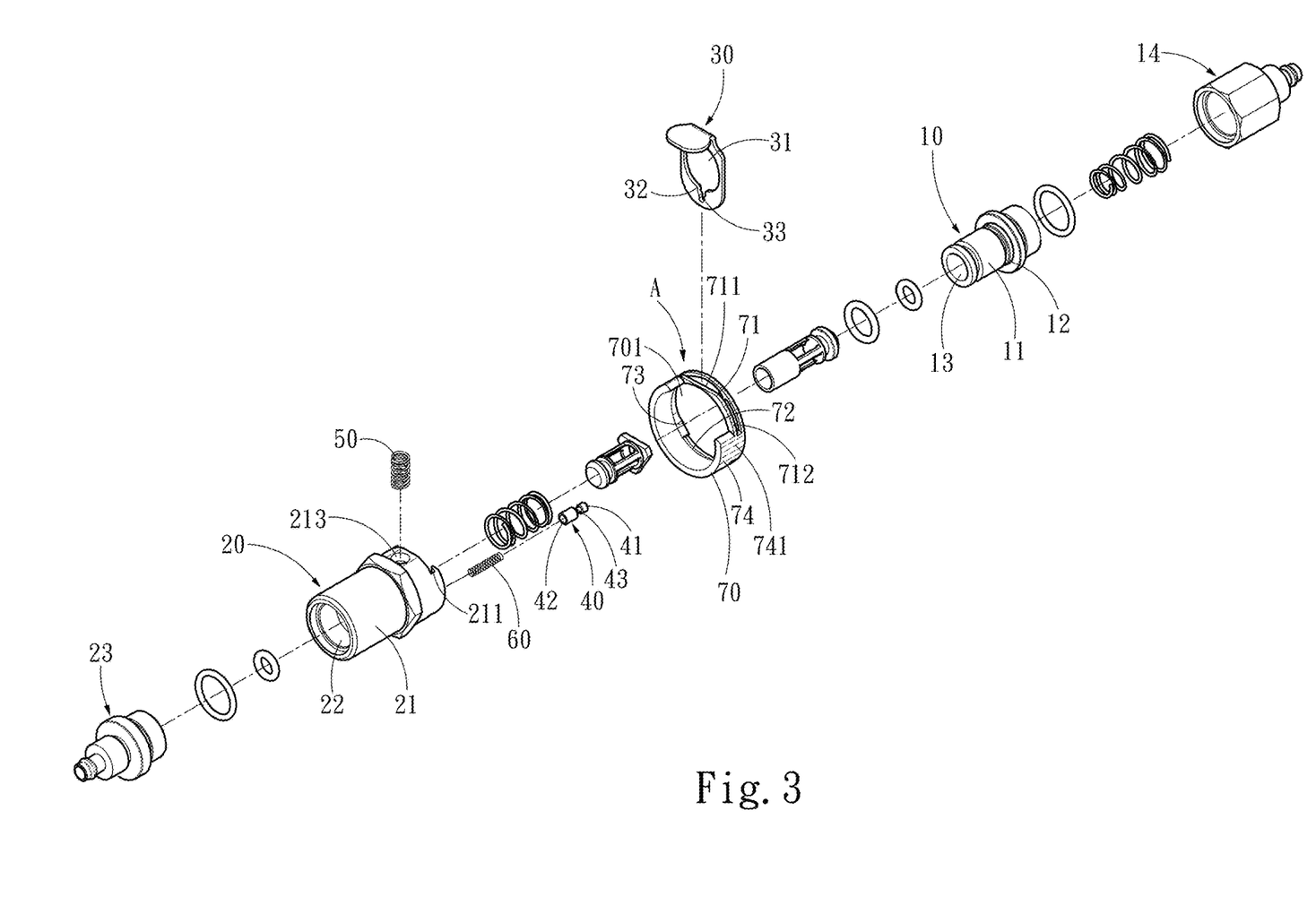
FIG. 3 is a structural exploded diagram of the invention configured to the quick-release connector.

Please refer to FIG. 3 and FIG. 4. The pressing fastener 30 includes an opening 31, a snap portion 32 and a snap slot 33, the opening 31 is provided for the first pipe body 11 to pass through, the snap portion 32 is adjacent to the opening 31, the snap slot 33 is connected to the opening 31, and the snap slot 33 includes a snap slot width along a moving direction of the pressing fastener 30 relative to the radial chute 211, and the snap slot width is tapered toward an end of the snap slot 33. When the pressing fastener 30 is at the locking position, the snap portion 32 extends into the second flow channel 22 and clamped into the annular groove 12 to fix the first pipe body 11 (as shown in FIG. 4) so that the first connector 10 and second connector 20 are in a connectored state.

Please refer to FIG. 3 and FIG. 4. The pushing rod 40 includes a top portion 41, a bottom portion 42 and a neck portion 43, the neck portion 43 is between the top portion 41 and the bottom portion 42. A length of the neck portion 43 is larger than a thickness of the pressing fastener 30. The neck portion 43 includes a first neck surface 431 and a second neck surface 432. A diameter of the first neck surface 431 is smaller than that of the second neck surface 432. The first neck surface 431 is connected to the top portion 41, the second neck surface 432 is connected to the bottom portion 42. Preferably, the first neck surface 431 and the second neck surface 432 are connected by a connecting inclined surface 433.

Please refer to FIG. 4 and FIG. 5. The bottom portion 42 of the pushing rod 40 is slidably disposed in the axial chute 212, and the pushing spring 60 is disposed between the bottom portion 42 and the axial chute 212. The neck portion 43 is snapped into the snap slot 33 and is limited to slide on the snap slot 33. When the pressing fastener 30 is at the locking position, the snap slot width where the snap slot 33 facing the neck portion 43 is between thicknesses of the first neck surface 431 and the second neck surface 432. When the pressing fastener 30 is at the unlocking position, the snap slot width where the snap slot facing the neck portion 43 is greater than the thickness of the second neck surface 432.

When the pressing fastener 30 is at the locking position, the second neck surface 432 does not able to penetrate into the snap slot 33 (as shown in FIG. 4), and when a user presses the pressing fastener 30, the pressing fastener 30 slides relative to the radial chute 211, and the pressing fastener 30 is changed to the unlocking position from the locking position (as shown in FIG. 5).

When the pressing fastener 30 is at the unlocking position, the opening 31 is right facing the second flow channel 22 for the first pipe body passing through, at the time the snap portion 32 does not clamp into the annular groove 12, and the first connector 10 and the second connector 20 are in a separable state. Meanwhile, the second neck surface 432 penetrates into the snap slot 33, and the pushing spring 60 pushes the pushing rod 40 so that the top portion 41 pushes the first connector 10 to be separated from the second connector 20 (as shown in FIG. 5).

Figure 6A:
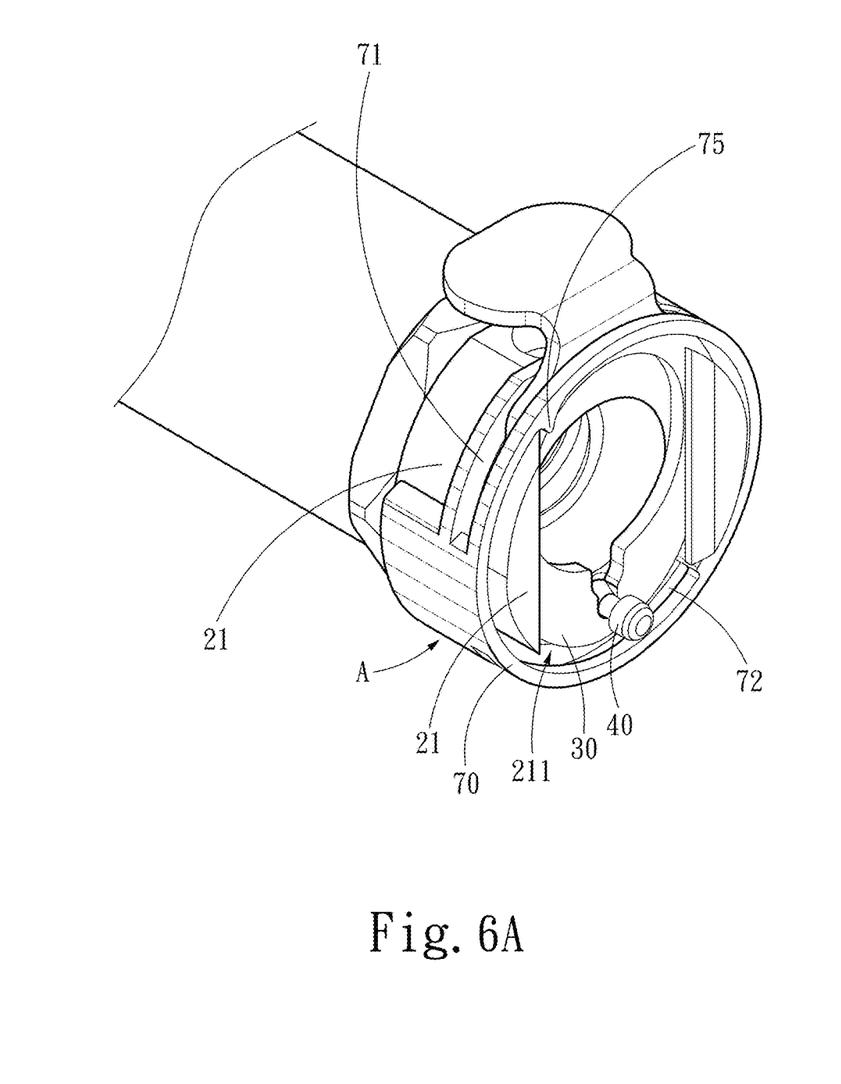
FIG. 6A is a structural diagram of the invention at an open position.
Figure 6B:
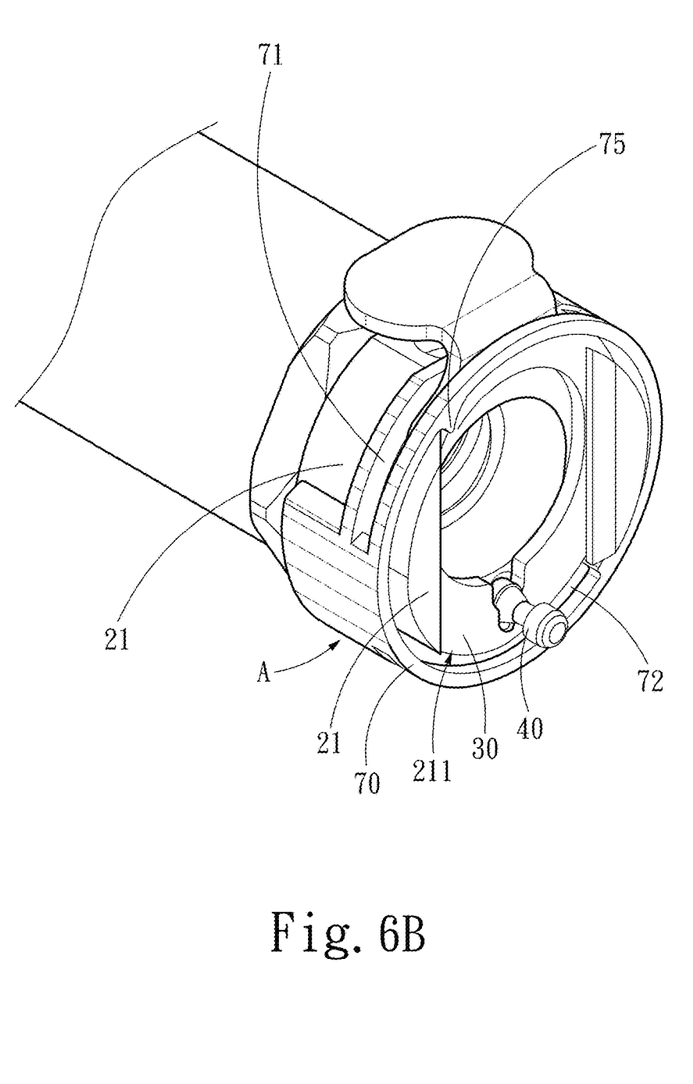
FIG. 6B is a structural diagram of a pressing fastener of the invention is pressed.
Figure 6C:
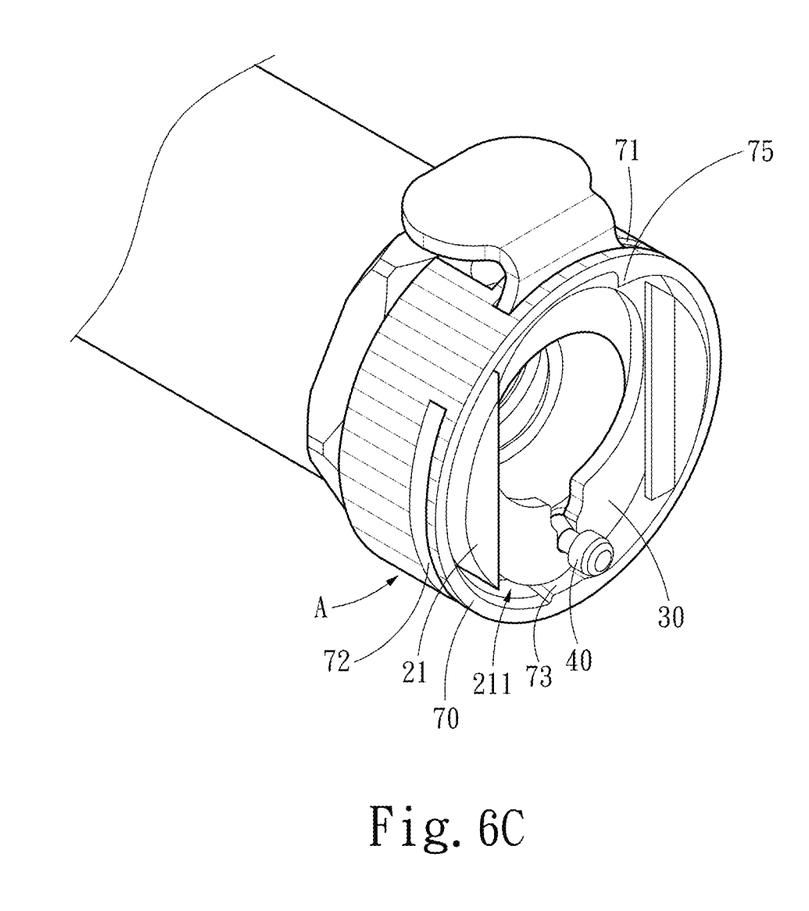
FIG. 6C is a structural diagram of the invention at a close position.

Please refer to FIG. 1, FIG. 6A, FIG. 6B, and FIG. 6C. The quick-release connector switch device A includes an annular switch 70. The annular switch 70 is provided with an annular chute 71, a through hole 72 and a convex surface 73. The annular switch 70 is rotatably sleeved on the second pipe body 21, and the annular chute 71 is located on the radial chute 211 for the pressing fastener 30 passing through. The annular switch 70 rotates relative to the radial chute 211 to provide with an opening position and a closing position. When the annular switch 70 is at the opening position, the pressing fastener 30 aligns the through hole 72 (as shown in FIG. 6A), so that the pressing fastener 30 is allowed to pass the through hole to be capable of being pressed, the pressing spring 50 is compressed when the pressing fastener 30 is pressed so that the first connector 10 and the second connector 20 are in a separable state (as shown in FIG. 6B). Further, when the annular switch 70 is located at the closing position, the pressing fastener 30 aligns the convex surface 73 (as shown in FIG. 6A), and the convex surface 73 abuts the pressing fastener 30 so that the pressing fastener 30 is unable to be pressed.

Figure 1:
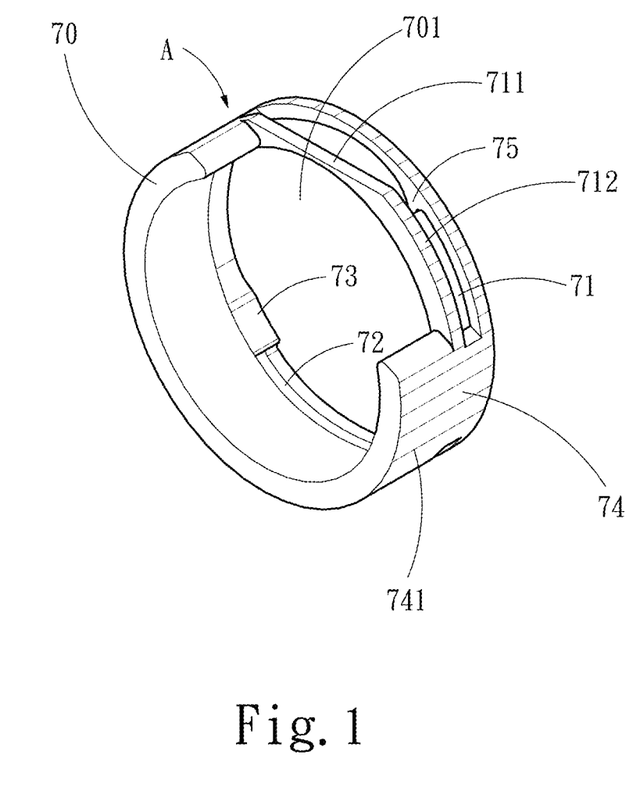
FIG. 1 is a structural diagram of the invention.
Figure 2:
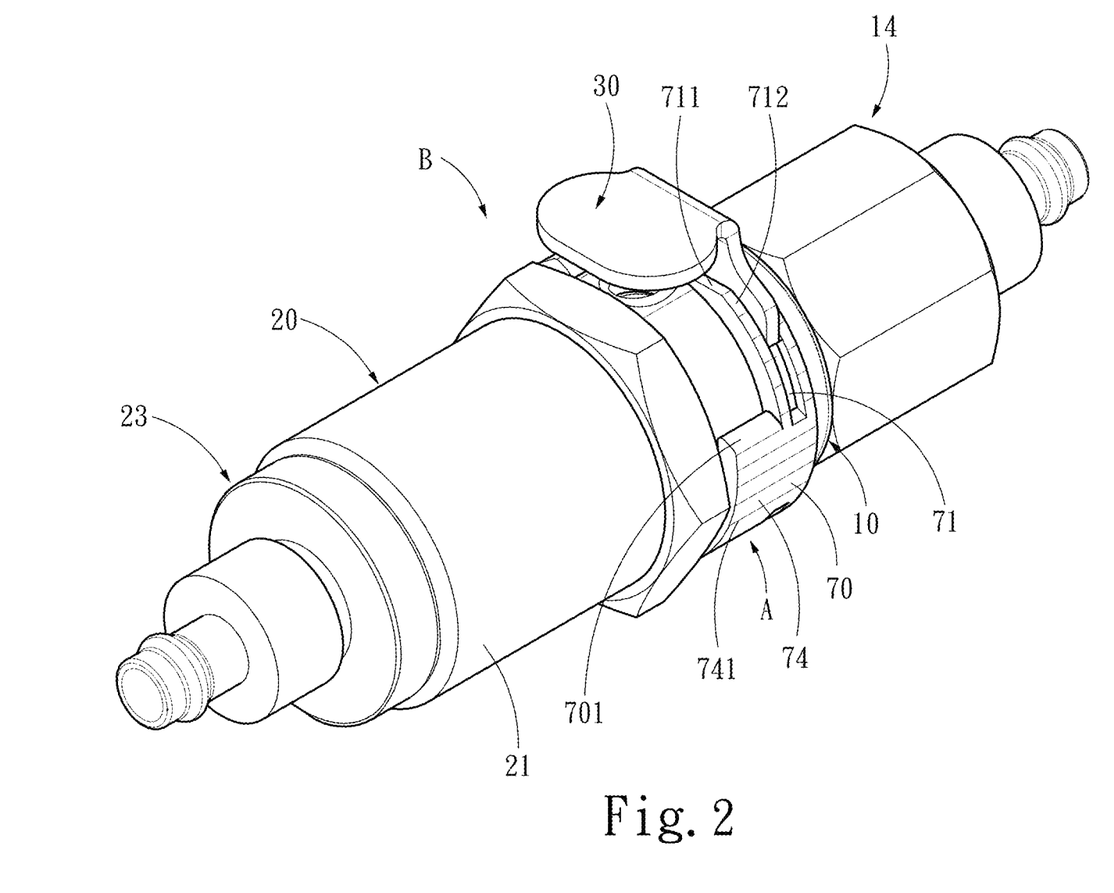
FIG. 2 is a structural diagram of the invention configured to a quick-release connector.

Please refer to FIG. 1 and FIG. 6A, in an embodiment, the annular switch 70 includes an operation space 701 adjacent to the annular chute 71 for accommodating the pressing fastener 30.

In an embodiment, one side of the annular switch 70 includes a straight surface 711 and an arc surface 712 adjacent to the annular chute 71, the straight surface 711 is sunken toward the through hole 72. When the annular switch 70 is at the opening position, the pressing fastener 30 contacts the straight surface 711. When the annular switch 70 is at the closing position, the pressing fastener 30 contacts the arc surface 712. By a design of the straight surface 711, a pressure of the pressing fastener 30 can be evenly shared to prevent the annular switch 70 from being deformed due to excessive pressure.

In an embodiment, the annular switch 70 includes an outer annular surface 74 provided with a plurality of anti-slip ridges 741 to avoid slipping and facilitate rotation of the annular switch 70.

In an embodiment, the convex surface 73 is thickened toward a center of the annular switch 70 to contact the pressing fastener 30 and increase a structural strength of the convex surface 73, thereby increasing of serving life.

In an embodiment, a positioning flange 75 is disposed at where the annular switch 70 is adjacent to the annular chute 71, when the annular switch 70 is rotated to the opening position, the positioning flange 75 abuts the second pipe body 21 (as shown in FIG. 6A) to assist in positioning the pressing fastener 30 to align the through hole 72.

Through the foregoing implementation of the invention, compared with the prior art, the invention has the following characteristics:

1. By rotating the annular switch to the opening position or the closing position to control the pressing fastener in a state of being pressed or in a state of not being pressed, so as to prevent an unexpected separation of the first connector and the second connector from an accidental contact.
2. By a design of the annular switch with the straight surface to share the pressure of the pressing fastener and prevent the annular switch from being deformed due to excessive pressure.
3. The convex surface is thickened toward a center of the annular switch to contact the pressing fastener and increase a structural strength of the convex surface, thereby increasing of serving life.
4. By providing the positioning flange to be fastened against the second pipe body to assist in positioning the pressing fastener to right face the through hole and ensure the pressing fastener can be pressed.
5. The outer annular surface is provided with a plurality of anti-slip ridges avoid slipping and facilitate rotation of the annular switch.

What is claimed is:

1. A quick-release connector switch device, for being equipped with a quick-release connector, the quick-release connector comprising a first connector, a second connector and a pressing fastener, the first connector comprising a first pipe body and an annular groove on an outer edge of the first pipe body; the second connector comprising a second pipe body provided with a radial chute radially passes through the second pipe body; the pressing fastener slidably passing into the radial chute and comprising a locking position and an unlocking position, a pressing spring being disposed between the pressing fastener and the second pipe body to push the pressing fastener moving from the unlocking position to the locking position, the pressing fastener comprising an opening and a snap portion, the opening provided for the first pipe body to pass through, the snap portion disposed adjacent to the opening, when the pressing fastener located at the locking position, the snap portion clamped into the annular groove to fix the first pipe body, when the pressing fastener located at the unlocking position, the snap portion without clamping into the annular groove so that the first connector and the second connector are in a separable state, the quick-release connector switch device characterized in that, the quick-release connector switch device comprises an annular switch provided with an annular chute, a through hole and a convex surface, the annular switch is rotatably sleeved on the second pipe body and the annular chute is located on the radial chute for the pressing fastener passing through the annular chute, wherein the annular switch is configured to rotate relative to the radial chute to provide with an opening position and a closing position; when the annular switch is located at the opening position, the pressing fastener aligns with the through hole so that the pressing fastener is allowed to pass the through hole to be capable of being pressed to compress the pressing spring, and the first connector and the second connector are in the separable state; when the annular switch is located at the closing position, the pressing fastener aligns the convex surface, and the convex surface abuts the pressing fastener so that the pressing fastener is not capable of being pressed.

2. The quick-release connector switch device as claimed in claim 1, wherein the annular switch comprises an operation space adjacent to the annular chute.

3. The quick-release connector switch device as claimed in claim 1, wherein the annular switch comprises a straight surface and an arc surface, the straight surface is sunken toward the through hole, when the annular switch is at the opening position, the pressing fastener contacts the straight surface, when the annular switch is at the closing position, the pressing fastener contacts the arc surface.

4. The quick-release connector switch device as claimed in claim 1, wherein the annular switch comprises an outer annular surface provided with a plurality of anti-slip ridges.

5. The quick-release connector switch device as claimed in claim 1, wherein the convex surface is thickened toward a center of the annular switch.

6. The quick-release connector switch device as claimed in claim 1, wherein a positioning flange is disposed at where the annular switch is adjacent to the annular chute, when the annular switch is rotated to the opening position, the positioning flange abuts the second pipe body.

* * * * *